(12) United States Patent
Waterstredt et al.

(10) Patent No.: US 9,728,314 B2
(45) Date of Patent: Aug. 8, 2017

(54) LATCHING SOLENOID REGULATOR VALVE

(71) Applicant: BorgWarner Inc., Auburn Hills, MI (US)

(72) Inventors: Jeffrey J. Waterstredt, Royal Oak, MI (US); R. Keith Martin, Marlette, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 14/609,626

(22) Filed: Jan. 30, 2015

(65) Prior Publication Data
US 2015/0221427 A1 Aug. 6, 2015

Related U.S. Application Data

(60) Provisional application No. 61/933,926, filed on Jan. 31, 2014.

(51) Int. Cl.
```
F16K 31/02    (2006.01)
H01F 7/08     (2006.01)
F16K 35/00    (2006.01)
F15B 11/16    (2006.01)
F15B 13/02    (2006.01)
F15B 13/042   (2006.01)
F15B 13/044   (2006.01)
F16K 31/06    (2006.01)
H01F 7/128    (2006.01)
```

(52) U.S. Cl.
CPC .......... *H01F 7/088* (2013.01); *F15B 11/16* (2013.01); *F15B 13/025* (2013.01); *F15B 13/042* (2013.01); *F15B 13/044* (2013.01); *F16K 31/0613* (2013.01); *F16K 31/0668* (2013.01); *F16K 31/0675* (2013.01); *F16K 35/00* (2013.01); *H01F 7/128* (2013.01); *F15B 2211/50554* (2013.01); *F15B 2211/71* (2013.01); *F15B 2211/78* (2013.01)

(58) Field of Classification Search
CPC .................................... F16K 31/0613
USPC ..................................... 251/129.15
See application file for complete search history.

(56) References Cited

U.S. PATENT DOCUMENTS

| 3,807,441 | A | * | 4/1974 | Grosseau | F16K 31/0613 137/495 |
| 4,838,954 | A | * | 6/1989 | Perach | F16H 61/0251 137/625.17 |
| 4,966,195 | A | * | 10/1990 | McCabe | F16H 61/0251 137/625.61 |
| 6,378,557 | B2 | * | 4/2002 | Kawamura | F16H 61/0251 137/625.64 |
| 7,909,060 | B2 | * | 3/2011 | Yamamoto | G05D 16/2026 137/625.6 |

(Continued)

*Primary Examiner* — Alexander Talapalatski
(74) *Attorney, Agent, or Firm* — Warn Partners, P.C.

(57) ABSTRACT

A latching solenoid assembly is provided which includes a solenoid actuator. A housing is also provided which has an axial passage. An intermediate piston is moved by the solenoid actuator. A reaction member is also placed within the housing axial passage spring biased by a transfer spring from the intermediate piston. The housing has a latching port allowing pressure to latch the intermediate piston in position to set the force which is transmitted to the reaction member.

12 Claims, 4 Drawing Sheets

(56) References Cited

U.S. PATENT DOCUMENTS

| | | | | |
|---|---|---|---|---|
| 8,397,759 | B2* | 3/2013 | Oikawa | F16K 11/0716 137/596.2 |
| 2009/0057583 | A1* | 3/2009 | Van Weelden | F16K 31/0613 251/12 |
| 2009/0224192 | A1* | 9/2009 | Oikawa | F16K 11/0716 251/129.15 |
| 2009/0256091 | A1* | 10/2009 | Nordstrom | F16K 31/0613 251/129.15 |
| 2010/0301248 | A1* | 12/2010 | Yamamoto | F15B 13/0403 251/129.15 |
| 2011/0073791 | A1* | 3/2011 | Oikawa | F16K 31/0613 251/129.15 |
| 2012/0211686 | A1* | 8/2012 | Okamoto | F16K 31/0624 251/129.15 |

* cited by examiner

LATCHING SOLENOID REGULATOR VALVE

FIELD OF THE INVENTION

The present invention relates to solenoid actuators.

BACKGROUND OF THE INVENTION

It is often desirable in hydraulically actuated or controlled devices such as transmissions to actuate a device or control a property related to the fluid in the device utilizing a solenoid actuator.

SUMMARY OF THE INVENTION

A latching solenoid valve assembly is provided. The latching solenoid valve assembly includes a solenoid actuator. A housing is also provided which has an axial passage. An intermediate piston mounted in the axial passage, is movable by the solenoid actuator. A reaction member is placed within the housing axial passage and is spring biased by a transfer spring from the intermediate piston. The reaction member can perform many functions such as a plunger or other mechanical actuators, pressure or flow valve spool, or a poppet valve. The intermediate piston is adjacent a latching port that can be pressurized to set the force transmitted to the reaction member via the transfer spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
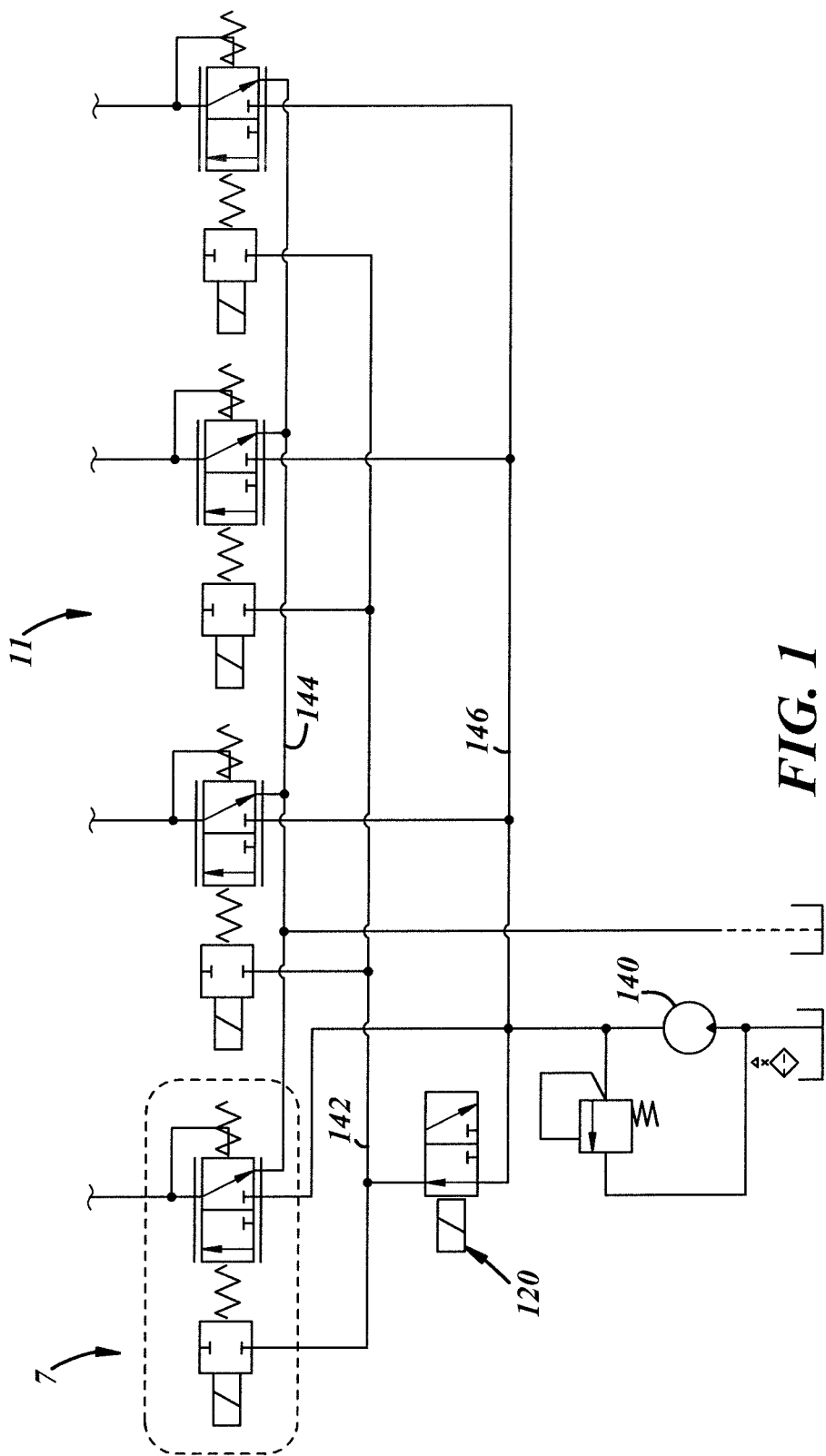
FIG. 1 is a schematic arrangement which utilizes a latching solenoid actuator assembly of the present invention.
Figure 2:
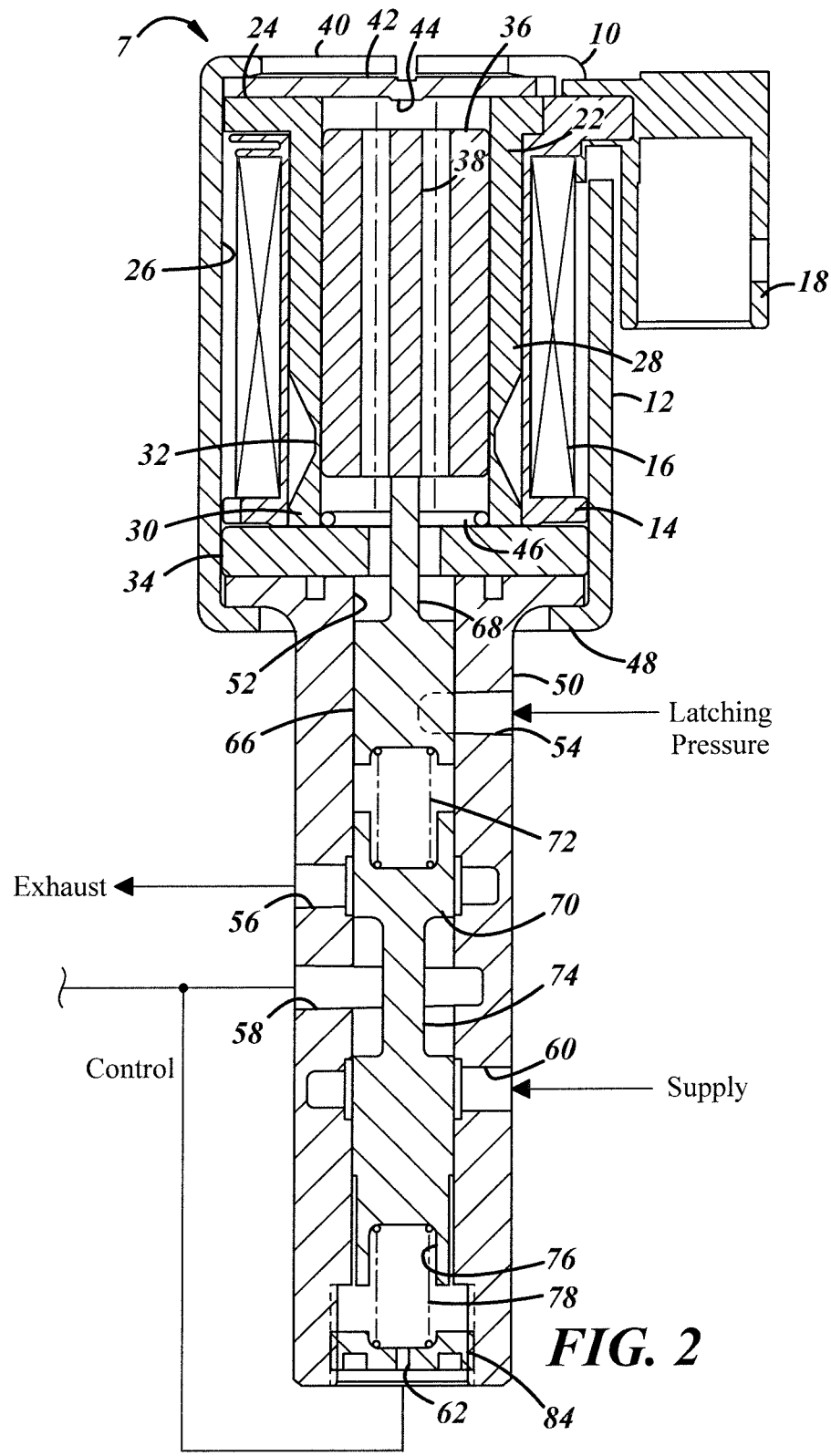
FIG. 2 is a sectional view of a preferred embodiment latching solenoid actuator assembly according to the present invention.

Referring to FIGS. 1 and 2, a latching solenoid actuator assembly 7 according to the present invention is provided. As shown in FIGS. 1 and 2, the latching solenoid actuator assembly 7 is utilized as a pressure control valve. The latching solenoid actuator assembly 7 has a solenoid actuator 10. Solenoid actuator 10 includes a magnetic housing or frame often referred to as a can 12. The can 12 is typically fabricated in a ferromagnetic material such as steel. Mounted inside the can 12 is a bobbin 14. The bobbin 14 is typically made from a non-magnetic material such as a polymeric material such as a plastic. Wrapped around the bobbin 14 is a coil shown schematically as item 16. An electrical connector 18 is provided to allow for connection with a control source which controls current actuation of the coil 16. The connector in most applications will be fabricated from a non-magnetic material. Positioned within the bobbin 14 is a flux core 22. The flux core 22 on most of its upper circumferential periphery has a radial flange 24 which is in contact with an interior wall 26 of the can 12 to establish magnetic continuity. Integrally joined to the flange portion 24 of the flux core 22 is a flux return portion 28. As shown, the flux core 22 is integrally joined to a pole shunt 30. The pole shunt 30 is separated by a narrowing of the flux core 22 referred to as a flux choke 32. The pole shunt 30 abuts a pole washer 34. The pole washer 34 is also fabricated from a magnetic material and is typically provided by a ferromagnetic material such as steel. The pole washer provides magnetic continuity between the pole shunt 30 and the can 12. Slidably mounted within the flux core 22 is a ferromagnetic armature 36. The armature 36 has axially extending through bores 38 to allow the passage of hydraulic fluid through the armature, especially in applications where the solenoid valve 7 is a submersible solenoid valve. Positioned on top of the flange portion 24 of the flux core and captured to the flux core by a crimping flange portion 40 of the can is an end cap 42. End cap 42 provides a stop 44 to prevent hydraulic stiction of the armature 36 with the end cap 42.

Solenoid actuator assembly 7 also has a non-magnetic annular ring member 46 which acts as a stop to prevent the armature from magnetic locking on the pole washer 34.

Connected with the solenoid actuator 10 by a crimped portion 48 of the can 12 is a hydraulic housing 50. The hydraulic housing 50 has a generally axial bore or passage 52. The hydraulic housing axial passage 52 has transversely intersecting latching port 54, exhaust port 56, transverse control port 58 and supply port 60. An extreme end of the hydraulic housing has an axial control feedback port 62. In the example shown in FIG. 1, the exhaust port 56 is closest to the solenoid actuator 10 followed by the transverse control port 58 and the supply port 60.

Positioned slidably within the axial passage 52 of the hydraulic housing is an intermediate piston 66. The intermediate piston 66 has a stem 68 which is contacted by the armature 36 to allow the armature to move the intermediate piston. Also slidably mounted within the axial passage 52 is a reaction member provided by a metering valve spool 70. The metering spool is biased into position by a transfer spring 72 which extends between the intermediate piston 66 and the metering spool 70. The metering spool 70 has a shank 74 to allow fluid flow between the supply port 60, the control port 58 and the exhaust port 56, depending upon the position of the metering spool 70. The metering spool 70 also has a spring seat 76 which mounts a reaction spring 78 which extends between the metering spool 70 and the axial control port 62. The reaction spring 78 places a force on the metering spool 70 opposite of the force of the transfer spring 72. The axial control port 62 is provided within a plug 84. In most applications, the spring constant of the spring 78 will be less than that of the spring 72.

The area inside the axial passage 52 wherein the reaction spring 78 is placed also provides a pressure feedback area that acts upon the metering spool 70. Optionally, an internal passage of the housing can connect the area of the axial passage which mounts the reaction spring 78 to intersect with the area that mounts the transfer spring 72 to provide multiple pressure feedback areas to act upon the spool valve 70 in concert with the transfer spring 72 to regulate the control pressure.

In operation, solenoid actuator assembly 7 is energized to provide a magnetic force that is transferred through the intermediate piston 66, through the transfer spring 72 and the metering spool 70. Solenoid actuator 7 is typically a proportional type solenoid actuator. Upon achieving a desired force, the given pressure is selected. The intermediate piston 66 is latched in position by then pressurizing the latching port port 54 thereby side loading the intermediate piston and locking it in position. Once the intermediate piston 66 is pressure latched, the desired pressure for the control system will essentially be set and the metering spool 70 will remain able to regulate the control pressure. If the pressure in the control port 58 and 62 is too low, the force on the transfer spring 72 will urge the metering spool 70 toward the supply port 60 as shown in FIG. 2 causing pressure to rise to the desired pressure. If pressure within the control port 58 is too great, the pressure will overcome the transfer spring force and urge the spool 70 toward the exhaust port 52 as shown in FIG. 2 causing the pressure to fall to the desired pressure.

Referring to FIG. 1, a valve arrangement 11 is shown having multiple latching solenoid actuator assemblies 7. The arrangement 11 allows a multiple of latching solenoid valves to be used to set selectively different control pressures for various fluid pressure actuated/controlled components of a transmission or other fluid power using device. A master solenoid on-off valve 120 is provided that can connect a supply pressure header 146 with a pressure latching header 142. The latching solenoid regulator valve assemblies are also connected with an exhaust header 144 for their respective exhaust ports. The supply pressure header is fed by an oil pump 140. The master on-off valve 120 has a fail-safe to the non-actuated position to prevent the latching pressure ports in the latching solenoid valve assemblies 7 from failing in the on position.

Figure 3:
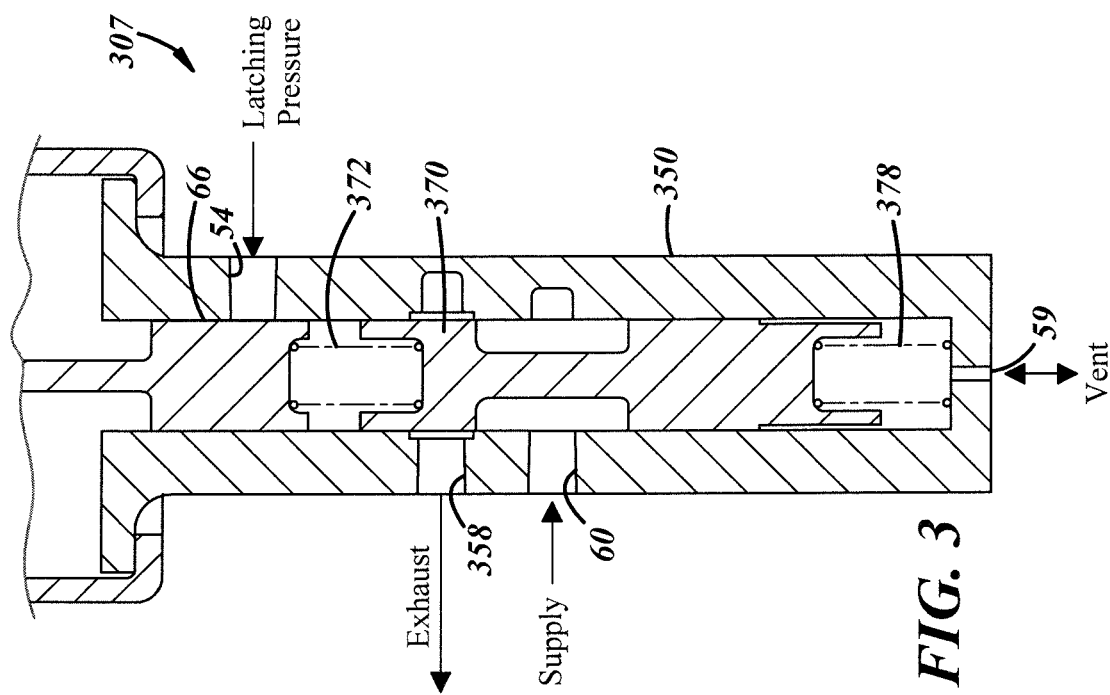
FIG. 3 is a view similar to that of FIG. 2 illustrating a latching solenoid actuator assembly utilized as a two-way flow control valve.

FIG. 3 is a view similar to that of FIG. 1 illustrating the hydraulic housing 350 of a two-way flow control latching solenoid actuator assembly 307 according to the present invention. The latching solenoid actuator assembly 307 has a solenoid actuator (mainly not shown) similar to that as previously described in FIG. 2 for the latching solenoid actuator assembly 7. The latching solenoid actuator assembly 7 has an intermediate piston 66 as previously described which can be latched by pressurizing a latching pressure port 54 as previously described. There is provided a transfer spring 372 which transfers force to a reaction member 370. Reaction member 370 is a valve spool which controls flow from a supply port 60 to an output port 358. The valve spool 370 is spring biased by a reaction spring 378. At an extreme end of the hydraulic housing 350 there is provided a vent 59. The latching solenoid actuator assembly 307 is utilized to regulate the flow opening from the supply port 60 to the output port 358.

Figure 4:
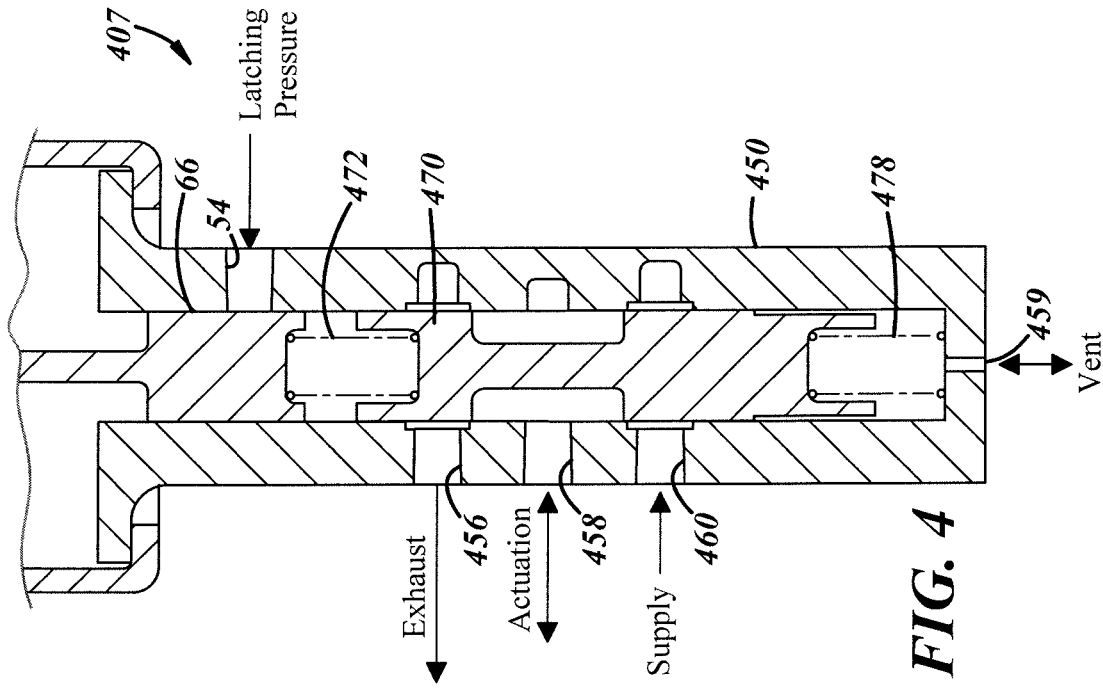
FIG. 4 is a view similar to that of FIG. 2 illustrating a latching solenoid actuator assembly utilized as a three-way flow control valve.

FIG. 4 is a view similar to that of FIG. 3 which of a latching solenoid actuator assembly 407 having a intermediate piston 66 which can be latched via a latching pressure port 54 provided in a hydraulic housing 450. A valve spool 470 is provided which is spring biased by a transfer spring 472 and by a reaction spring 478. The valve spool controls the fluid openings between a supply port 460 and an actuation port 458 and/or an actuation port 458 and an exhaust port 456. In a similar manner, a vent 459 is provided at an extreme end of the hydraulic port 450.

Figures 5, 6, 7:
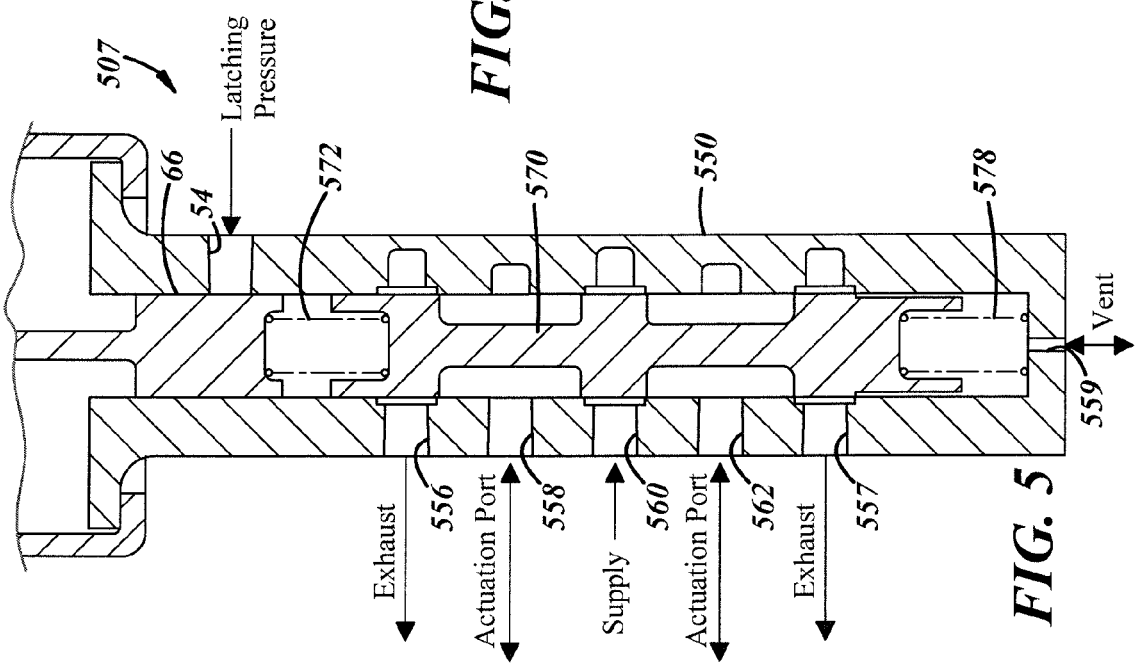
FIG. 5 is a view similar to that of FIG. 2 illustrating a latching solenoid actuator assembly utilized as a four-way flow control valve.
FIG. 6 is a view similar to that of FIG. 2 illustrating a latching solenoid actuator assembly utilized as a poppet valve.
FIG. 7 illustrates a latching solenoid actuator assembly utilized as a mechanical actuator.

FIG. 5 shows a four-way flow control valve arrangement latching solenoid actuator assembly 507 having a hydraulic housing 550 with a supply port 560, an exhaust port 556 with an actuation port 558 and a second actuation port 562 and second exhaust 557. The metering spool 570 is acted upon by transfer springs 572 and reaction spring 578 and by the intermediate piston 66 which is latchable via latching port 54 to alternately connect the supply port 560 with actuation port 558 while at the same time connecting the actuation port 562 with the exhaust 557 or to alternately connect the flow openings to connect the actuation port 558 with the exhaust 556 while connecting the supply port 560 with the actuation port 562. At an extreme end, a venting port 559 is also presented.

FIG. 6 provides a latching solenoid actuator assembly 607 utilized as a poppet valve having a hydraulic housing 650 with a supply port 660. Fluid flow from the supply port 660 to an outlet or exhaust 658 is controlled by a poppet valve 670 which can be biased by the intermediate piston 66. Intermediate piston 66 is latchable via latching pressure port 54. Intermediate piston 66 transfers force to the poppet valve 670 by a transfer spring 672 to force the valve poppet 670 against the valve seat 673. A vent 659 is provided adjacent to the transfer spring. In other embodiments not shown, a reaction spring may also be utilized.

Referring to FIG. 7, a latching solenoid actuator assembly utilized as a mechanical actuator is provided having a latching intermediate piston 66 latchable via a latching port 54. The intermediate piston 66 acts upon a transfer spring 772 in opposition to a reaction spring 778 to actuate a reaction member 770 which is a mechanical actuator or a plunger 771 having an aperture 773 for attachment with an object (not shown) to be actuated by the latching solenoid actuator 707. A vent 759 connects with the area adjacent the transfer spring 772.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A latching solenoid actuator assembly comprising:
   a solenoid actuator;
   a housing having an axial passage with an intersecting latching pressure port;
   an intermediate piston positioned within said housing axial passage movable by said solenoid actuator, said intermediate piston being latchable by frictional engagement with said passage by side loading resultant of pressurizing said latching pressure port;
   a transfer spring engaged by said intermediate piston; and
   a reaction member loaded by said intermediate piston via said transfer spring.

2. The latching solenoid actuator assembly of claim 1 wherein said reaction member is taken from the group of pressure regulating control valves, flow regulating valves, poppet valves or mechanical actuators.

3. The latching solenoid actuator assembly of claim 1 further having a reaction spring engaged against said reaction member to provide a force generally opposite a force placed upon said reaction member by said transfer spring.

4. The latching solenoid actuator assembly of claim 3 wherein said reaction spring has a lower spring constant than said transfer spring.

5. The latching solenoid actuator assembly of claim 1 wherein said housing is a hydraulic housing with an exhaust port, supply port, transverse control port and axial control port intersecting said axial passage, said housing having said exhaust port closest to said solenoid actuator followed by said transverse control port and said supply port.

6. The latching solenoid actuator assembly of claim 1 wherein said reaction member is a three-way flow control valve and wherein said housing has a supply port, control port and exhaust port and a reaction spring acting upon said reaction member in concert with said transfer spring regulates a valve opening from said supply port to said control port or from said control port to said exhaust port.

7. The latching solenoid actuator assembly of claim 1 said reaction member is a four-way flow control valve and wherein said housing includes a housing port, a first actuation port, a second actuation port and an exhaust port and wherein a reaction spring acts in concert with the transfer spring to regulate a valve opening from said supply port to said first actuation port and from said second actuation port to said exhaust port or from said supply port to said second actuation port and said first actuation port to said exhaust port.

8. An arrangement for controlling multiple latching solenoid actuator assemblies, there being at least two latching solenoid actuator assemblies including:

a solenoid actuator;

a housing having an axial passage with intersecting latching pressure port;

an intermediate piston positioned within said housing axial passage movable by said solenoid actuator, said intermediate piston being latchable by frictional engagement with said passage by side loading resultant of pressurizing said latching pressure port; and a transfer spring acted upon by said intermediate piston for the purpose of transferring load from said solenoid actuator, through said intermediate piston to a reaction member; and wherein said arrangement includes a master solenoid valve for supplying fluid pressure to said latching ports of said solenoid actuator assemblies.

9. The arrangement of claim 8 wherein said master solenoid valve is normally open to a sump.

10. The arrangement of claim 8 wherein said housing of said latching solenoid actuator assemblies are connected with supply ports and said supply ports of said solenoid latching valve assemblies are connected with a common header.

11. The arrangement of claim 8 wherein said latching solenoid actuator assemblies can be utilized to regulate fluid properties taken from the group of fluid pressure and fluid flow opening.

12. The arrangement of claim 8 wherein said latching solenoid actuator assemblies can by utilized to regulate differing levels of fluid properties taken from the group of fluid pressure and fluid flow opening control.

* * * * *